United States Patent Office 2,876,089
Patented Mar. 3, 1959

2,876,089
HERBICIDAL COMPOSITION

William H. Brugmann, Jr., Milltown, Arnold J. Morway, Clark, and Jeffrey H. Bartlett, Westfield, N. J., assignors to Esso Research and Engineering Company, a corporation of Delaware No Drawing. Application December 6, 1954
Serial No. 473,451

5 Claims. (Cl. 71—2.6)

The present invention relates to compositions for killing weeds, and more particularly, to improved compositions which will kill only the weeds to which they are applied and will not have adverse effects upon neighboring growths. Still more specifically, the present invention relates to improved compositions containing, as active herbicidal agents, halogen substitution products of phenoxy carboxylic acids, such as 2,4-dichlorophenoxyacetic acid, 2,4,5 and 2,4,6-trichlorophenoxy acetic acid, trichlorophenoxypropionic acids, their homologues and analogues.

2,4-dichlorophenoxyacetic acid and 2,4,5-trichlorophenoxyacetic acid, the corresponding propionic acids and their derivatives are particularly well known in the art to be effective plant hormone herbicides. Such products are widely used to control weeds and brush that reduce crop yields, block utility rights-of-way, stifle growth of pastures, and detract from the beauty of landscaping and scenery. The acids themselves are usually applied as salt or ester derivatives to the unwanted weeds and brush, either by spraying or dusting; if by spraying, this is often carried out by employing an aqueous solution or emulsion of a water-soluble salt of the acid, the latter being quite water-insoluble. As water soluble salts the sodium or the amine salts have been used. These compounds are relatively non-volatile, and hence are desirable, but their herbicidal activity is poor in that they are easily washed off treated plants or leached from treated soils. Oil-soluble formulations containing these acids as active ingredient are also available, such as the isopropyl or amyl esters. These materials are also very effective herbicides, but their use is accompanied by a severe drawback, their tendency to "drift."

"Drifting" is a phenomenon which is, to some extent, associated with vaporization and volatility and, in the case of weed killers, is the tendency of a composition to wander from the plot of ground to which it is applied over to neighboring fields. Certain crops, notably cotton, are extremely susceptible to 2,4-dichlorophenoxyacetic acid and its derivatives and can be severely damaged by vapors of the weed killer which may "drift" from fields which are planted with crops tolerant to the weed killer, such as rice, which may have been treated with the chemical for weed control. Most of the esterified forms of 2,4-D and 2,4,5-T, as these weed killers are commonly known, have high "drifting" characteristics and are thus hazardous to use in areas where the possibility of crop injury to neighboring 2,4-D non-tolerant crops exist. Furthermore, because of the high volatility of most available esterified forms of 2,4-D, the residual activity of the herbicide suffers and weed control is not as long-lasting as would be desirable.

It is, therefore, the principal purpose of the present invention to set forth a herbicide and weed killing composition incorporating the halogen substitution products of aryloxyalkyl carboxylic acids which, while being oil-soluble, are of high potency and do not exhibit the "drifting" characteristics hitherto associated with esters of 2,4-D and 2,4,5-T, a characteristic so undesirable that in some States the use of esters of these acids is banned.

It is a further object of the present invention to set forth a herbicide composition containing as active ingredient derivatives of 2,4-D and 2,4,5-T which provides herbicidal control of greater extent and longer duration than hitherto found possible.

A still further object of the present invention is to set forth a method of applying a superior herbicidal composition wherein more complete control is obtained than hitherto.

Other and further objects and advantages of the present invention will appear hereinafter.

Esters and salts of 2,4-D and 2,4,5-T are usually applied to brush in carriers such as water, oil, or oil/water emulsions. Foliage sprays and basal treatment around trees are the conventional treatment techniques. Frequently these treatments kill only the tops of the trees with the result that new growth subsequently resprouts from the roots. This is probably a result of poor residual properties of the foliage sprays and slow translocation of the chemical into the roots.

In accordance with the present invention, derivatives of 2,4-D and 2,4,5-T, and in particular the esters, are improved in adhesiveness by dispersing grease forming soaps therethrough. The homogeneous solidified esters may be applied as such or may be applied dispersed, preferably in a hydrocarbonaceous or mineral oil to form the finished product. Such products maintain a low volatility of esters, thus minimizing drift, and adhere readily to plant materials.

In further accordance with the present invention, and in a preferred embodiment thereof, the grease base formulation of 2,4-D, 2,4,5-T or mixtures thereof are applied to the brush, plant, or tree trunk just above the ground level. The formulations remain where they are applied, and are not washed off by rain or volatilized by heat. This permits the herbicide to be translocated to the roots and also produces a girdling effect around the entire circumference of the plant or tree trunk. This cuts off the passage of plant nutrients from the leaves to the roots and vice versa, thus resulting in death of the tree and the roots.

Suitable as the grease making soaps for the practice of this invention are the lithium, aluminum, barium and calcium soaps of $C_{12}$ to $C_{22}$ fatty acids or fats, including 12-hydroxy stearic acid. The preformed soaps of lithium stearate or lithium hydroxy stearate are preferred because they are of sufficiently low viscosity to give good penetration of the bark or leaf. Their high flash points prevent evaporation and excessive volatility in the hot sun or when aerated during spraying. Lithium stearate is easily dispersed. Lithium hydroxy stearate, also easily dispersible, gives excellent yields (consistency) with small amounts of soap. When the grease is agitated under high shear rates for long periods, it is stable against excessive breakdown to a fluid product.

The soaps and herbicides are suitably dispersed in an animal, vegetable or mineral oil. Of the mineral oils, generally preferred are Columbian distillates having a viscosity of 60 to 50 SSU at 100° F. and flash points between about 350° to 480° F., SSU being the Saybolt Universal viscosity in seconds.

In a preferred embodiment of the present invention, the active herbicide in the grease composition is the reaction product of 2,4-dichlorophenoxyacetic and 2,4,5-trichlorophenoxyacetic acid and certain branch-chained primary alcohols, and specifically the alcohols produced by carbonylation of certain branch-chained olefin fractions.

The ester products are not only of high herbicide potency but also are substantially free of the undesirable "drifting" characteristics hitherto associated with the esters. Surprisingly, this "drifting" is not particularly a function of the molecular weight of the alcohol for, the corresponding straight chain primary alcohol of the same molecular weight has pronounced "drifting" characteristics. This is particularly surprising in view of the well known fact that branch-chain alcohols and esters are substantially more volatile than the corresponding straight chain compounds.

The carbonylation, or Oxo, reaction, as it is commonly called, whereby the alcohol mixtures employed in the present invention are prepared, is now well known in the art. It is a two-stage synthesis process wherein, in a first stage, olefins, CO $H_2$, and a cobalt catalyst are reacted at pressures of about 2000-4000 p. s. i. g. and temperatures of 275-375° F. to form an aldehyde product containing one more carbon atom than the parent olefin, and the aldehyde product is subsequently hydrogenated to form the corresponding alcohol. Because of the nature of the reaction, except in the case of where ethylene is the feed, a single alcohol product is hardly ever obtained, for the CO and $H_2$ may add on to either of the two carbon atoms of the olefinic linkage. The process is described in U. S. Patent 2,327,066 to Roelen; 2,504,682 to Harlan, and many subsequent patents.

In accordance with one embodiment of the present invention, the alcohol product obtained when an olefin or olefin mixture having at least 6 carbon atoms in the molecule is employed as feed to the first stage of this reaction is esterified with the halogenated phenoxyalkylcarboxylic acid to form an ester product showing little or no "drift." In particular, this characteristic is best shown when there is employed as a feed to the Oxo stage a polypropylene or polymerized propylene-butylene fraction boiling in the heptene and higher range. Polypropylene is produced by acid polymerizing of propylene either alone or preferably with varying amounts of butylenes. The reaction product is a highly branched olefinic mixture, consisting principally of $C_6$, $C_7$, $C_9$, and $C_{12}$ olefinic components as well as minor amounts of other olefins. Furthermore, each component or fraction, such as the $C_7$ fraction, consists of a variety of branched heptenes which, after carbonylation and hydrogenation results in a mixture of primary octyl alcohols having a branched chain structure. Thus the $C_7$ polypropylene fraction gives rise to an isooctyl alcohol product consisting of about 25%, 4,5-dimethyl hexanol; 30% of 3,5-dimethyl hexanol; 20% of 3,4-dimethyl hexanol; the balance are methyl heptanols and trimethyl pentanols.

Similarly, the alcohols obtained by carbonylating the $C_9$ fraction is found to consist principally of trimethyl hexanols, while the $C_{12}$ fraction on carbonylation yields a mixture of tetramethyl nonanols, all, of course, primary alcohols. These alcohol mixtures, on esterification with 2,4-D or 2,4,5-T all exhibit high weed killing potency combined with excellent non-drifting characteristics.

It has further been found that the still pot residue after distillation of the alcohol fraction, sometimes referred to as "Oxo bottoms," not only has good weed-killing and herbicidal activity in its own right, but that it too may be esterified with the halogenated phenoxyacetic acids to produce an even more powerful weed killer and herbicide which will not "drift." In the carbonylation of a $C_7$ olefin polymer (i. e. polypropylene) fraction, the bottoms represent about 15-30% of the crude alcohol charged to the distillation zone. The bottoms consist of $C_{15}$-$C_{16}$ alcohols, $C_{24}$ acetals, $C_{16}$ ethers, and minor amounts of esters, ketones and aldols and higher boiling oxygenated organic compounds.

The following examples illustrate the preparation of the 2,4-D esters of these Oxo reaction products. The 2,4,5-T esters can be made by similar reactions.

EXAMPLE 1.—PREPARATION OF ISOOCTYL ESTER OF 2,4-D 65 g. isooctyl alcohol (from Oxo synthesis), 110.5 g. 2,4-D acid and 100 ml. toluene diluent were placed in an esterification apparatus and the mixture refluxed with stirring until the reaction was complete. 8.2 ml. water were formed. The toluene was then separated from the reaction mixture by vacuum distillation. Unreacted 2,4-D acid was separated by treating with aqueous sodium carbonate followed by ether extraction of the ester. 125 g. of ester were obtained (75.5% of theoretical) of 95.5% purity as indicated by chlorine analysis. The density of the ester was 1.12.

EXAMPLE 2.—PREPARATION OF $C_{10}$ OXO ESTER OF 2,4-D 79 g. $C_{10}$ Oxo alcohol, 110.5 g. 2,4-D acid and 100 ml. toluene were reacted in the manner described in Example 1. The yield was 143 g. of ester which had a density of 1.12.

EXAMPLE 3.—PREPARATION OF $C_{11}$ OXO ESTER OF 2,4-D 93 g. $C_{11}$ Oxo alcohol, 110.5 g. 2,4-D acid and 100 ml. toluene were reacted in the manner described in Example 1. The yield was 144 g. of ester which had a density of 1.10.

EXAMPLE 4.—PREPARATION OF $C_{13}$ OXO ESTER OF 2,4-D 100 g. $C_{13}$ Oxo alcohol, 110.5 g. 2,4-D acid and 100 ml. toluene were reacted in the manner described in Example 1. The yield was 150 g. of ester of 94% purity as indicated by chlorine analysis. The density was 1.06.

EXAMPLE 5.—PREPARATION OF SOLID WEED KILLERS

Formulation

| Ingredients: | Percent weight |
|---|---|
| Lithium soap of hydroxystearic acid | 10.00 |
| $C_{13}$ Oxo ester of 2,4-D | 90.00 |

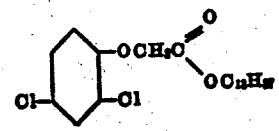

Prepared by dispersing soap in ester and heating while stirring to 400° F. All of the soap did not disperse. The undispersed soap was filtered from molten grease (5.0%) leaving a clear product which was rapidly cooled by pouring into shallow pans. On cooling the cake was homogenized to a homogeneous, uniform product.

Penetrations 77° F. mm./10:
  Unworked _____ 250.
  Worked 60 strokes _____ 260.
  Worked 100,000 strokes 275.
Dropping point, ° F. _____ 330.
Water solubility (boiling water) _____ Nil.
Volatility (evaporation rate, evaporation cut test) ____ 0.3% in 20 hours at 210° F.

EXAMPLE 6

The product of Example 5 was diluted 100% with Varsol (naphtha) and homogenized. An excellent smooth, solid grease-like material was formed, which could be diluted further and easily sprayed by mechanical equipment.

EXAMPLE 7

10.0% Thixcin (powdered hydrogenated castor oil)
90.0% $C_{13}$ Oxo ester of 2,4-D Prepared by dispersing Thixcin in the ester by mixing and warming to 150° F. When cold set up to a smooth uniform unctuous product.

Penetrations 77° F. mm./10:
- Unworked _____ 300
- Worked 60 strokes _____ 320
- Worked 100,000 strokes _____ 350

Dropping point, ° F. _____ 135

EXAMPLE 8

1.0% N stearyl p-amino phenol
99.0% $C_{13}$ Oxo ester of 2,4-D

Prepared by heating to 250° F. and allowing to cool. Excellent smooth uniform product of 300 mm./10 worked penetration. Dropping point, 210° F.

Powdered hydrogenated castor oil is one example of a non-soap thickener. Other non-soap thickeners that may be employed are carbon black, silica, bentonites and attapulgites.

EXAMPLE 9

The formulations below were tested on the coleus plant, being applied as a band around the stalk.

| Test Formulation | After, Days | Untreated | Treated Coleus #1 | Treated Coleus #2 |
|---|---|---|---|---|
| A ... {4.0% Lithium hydroxystearate / 94.0% Mineral ¹ Oil / 2.0% $C_8$ Oxo ester of 2,4-D} | 1 / 6 / 8 / 11 | Healthy / ...do... / ...do... / ...do... / ...do... | Healthy / Leaves Drooping / Small leaves Dead / All leaves Dead / Complete plant dead | Healthy. / Leaves Drooping. / Small leaves Dead. / All leaves Dead. / Complete Plant dead. |
| B ... {4.0% Lithium hydroxystearate / 48.0% Mineral Oil ¹ / 48.0% $C_{13}$ Oxo Ester of 2,4-D} | 1 / 6 / 8 / 11 | ...do... / ...do... / ...do... / ...do... | Healthy / Leaves Drooping / Small leaves Dead / All leaves Dead / Complete Plant Dead | Healthy. / Leaves Drooping. / Small leaves Dead. / All leaves Dead. / Complete Plant Dead. |

¹ A highly refined mineral oil having a viscosity of about 60 S.S.U.

EXAMPLE 10

The herbicidal grease formulation A of Example 9 was applied as a two inch wide band around the main trunk of an 18′ tall mountain ash tree. The band was about 1/16 inch thick. After several days hormone activity was observed at the tips of all branches. In two weeks the tree showed epinasty, and in five weeks the tree was completely dead.

EXAMPLE 11

Small dabs of the herbicidal grease formulations A and B of Example 9 were applied to the stems of poison ivy plants growing in a barberry hedge. In a few weeks all the treated plants were dead. There was no injury to the hedge.

EXAMPLE 12

The herbicidal grease formulation A of Example 9 was applied as a smear to the stems of dock plants growing next to a fence. On the other side of the fence was a neighboring rose garden. In a few weeks the dock plants were dead, while the rose plants were not harmed.

Furthermore, the alcohols that may be employed in the process of the present invention include not only the branch chained alcohols indicated, but also their derivatives and dimers. Thus, the alcohols may be condensed in the presence of an alkaline condensation agent, such as NaOH, to form the dimeric alcohol in accordance with the Guerbet reaction. These dimer alcohols not only possess the branchiness of the original Oxo alcohols but also additional branching due to the condensation reaction.

Dimerized Oxo alcohols may also be produced during the Oxo process itself by the addition of zinc or other reaction modifiers. Also, the Oxo aldehydes may be aldolized, dehydrated and hydrogenated to yield the corresponding dimeric alcohols. In each case, the alcohol is esterified with 2,4-D, 2,4,5-T, or their mixtures.

What is claimed is:

1. A grease composition having herbicidal characteristics which comprises a liquid base comprising a herbicidal liquid ester of a halogenated aryloxy carboxylic acid and an aliphatic primary alcohol having at least 7 carbon atoms, said liquid base being thickened by having finely dispersed therein a grease-forming soap selected from the group consisting of lithium, aluminum, barium and calcium soaps of $C_{12}$ to $C_{22}$ fatty acids.

2. A grease composition having herbicidal characteristics which comprises a liquid base comprising a herbicidal liquid ester of a chlorinated phenoxy acetic acid and a branched chain aliphatic primary alcohol having at least 7 carbon atoms, said liquid base being thickened by having dispersed therein a grease-forming soap selected from the group consisting of lithium, aluminum, barium, and calcium soaps of $C_{12}$ to $C_{22}$ fatty acids.

3. A grease composition according to claim 2 which is dispersed in a mineral oil having a viscosity of 60 to 550 SSU at 100° F.

4. A grease composition having herbicidal characteristics which comprises a liquid base comprising (a) a herbicidal liquid ester of a chlorinated phenoxy acetic acid and a branched chain aliphatic primary alcohol having at least 7 carbon atoms, and (b) a mineral oil having a viscosity of 60 to 550 SSU at 100° F.; said liquid base being thickened by having dispersed therein a grease-forming lithium soap of a $C_{12}$ to $C_{22}$ fatty acid.

5. A grease composition having herbicidal properties which comprises a liquid base comprising a herbicidal liquid ester of 2,4-dichlorophenoxy acetic acid having the formula

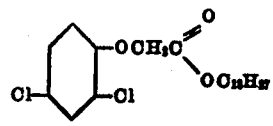

wherein the $C_{13}H_{27}$ group is derived from a $C_{13}$ branched chain aliphatic alcohol, said liquid base being thickened by having finely dispersed therein a grease-forming lithium soap of hydroxystearic acid.

References Cited in the file of this patent

UNITED STATES PATENTS

| | | |
|---|---|---|
| 1,999,524 | Molin | Apr. 30, 1935 |
| 2,284,970 | Avery | June 2, 1942 |
| 2,326,471 | Lontz | Aug. 10, 1943 |
| 2,417,264 | Morway et al. | Mar. 11, 1947 |
| 2,580,653 | Bridgeman | Jan. 1, 1952 |
| 2,585,875 | Swaney | Feb. 12, 1952 |

OTHER REFERENCES

Agricultural Chemicals, December 1952, page 26.
Botanical Gazette, December 1944, page 218.